US008990233B2

(12) United States Patent
Chen et al.

(10) Patent No.: US 8,990,233 B2
(45) Date of Patent: Mar. 24, 2015

(54) METHOD FOR IMPLEMENTING CONTEXT AWARE SERVICE APPLICATION AND RELATED APPARATUS

(71) Applicant: Huawei Technologies Co., Ltd., Shenzhen (CN)

(72) Inventors: Shan Chen, Shenzhen (CN); Qifeng Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 13/718,414

(22) Filed: Dec. 18, 2012

(65) Prior Publication Data

US 2013/0110857 A1 May 2, 2013

Related U.S. Application Data

(63) Continuation of application No. PCT/CN2011/074570, filed on May 24, 2011.

(30) Foreign Application Priority Data

Jun. 18, 2010 (CN) .......................... 2010 1 0213660

(51) Int. Cl.
*G06F 17/30* (2006.01)
(Continued)

(52) U.S. Cl.
CPC ...... *G06F 17/30386* (2013.01); *H04L 12/2887* (2013.01);
(Continued)

(58) Field of Classification Search
CPC .................... G06F 17/30386; G06F 17/30887; G06F 17/30864; G06F 17/17; G06F 17/3089; G06F 17/30; H04W 4/005; H04W 24/10; H04W 52/0258; H04W 4/00; H04W 45/64; G06N 3/00; H04L 67/327; H04L 45/64; H04L 12/2887; H04L 29/06; H04L 63/0428; H04B 5/0031; H04N 9/87; G06Q 10/0633
USPC .......... 707/758, 749, 737, E17.002, 706, 728; 370/331, 401, 395.2, 389.338, 349, 370/392, 400, 311, 395.3, 431, 466, 465, 370/230, 238, 254, 351; 455/422.1, 456.3, 455/436, 41.1, 456.2, 437; 709/204, 228, 709/217
See application file for complete search history.

(56) References Cited

U.S. PATENT DOCUMENTS 6,490,579 B1 * 12/2002 Gao et al. ...................... 707/707
(Continued)

FOREIGN PATENT DOCUMENTS

CN 1726091 A 2/2006
(Continued)

OTHER PUBLICATIONS

Chang Xu and S. C. Cheung—"Inconsistency detection and resolution for context-aware middleware support"—Proceeding ESEC/FSE-13 Proceedings of the 10th European software engineering conference held jointly with 13th ACM SIGSOFT international symposium on Foundations of software engineering—Sep. 5-9, 2005—pp. 336-345.*
(Continued)

*Primary Examiner* — Anh Ly
(74) *Attorney, Agent, or Firm* — Brinks Gilson & Lione

(57) ABSTRACT

Embodiments of the present disclosure disclose a method for implementing a context aware service application and a related apparatus. One method for implementing a context aware service application includes: receiving, by a context aware service platform, a first context request from a context aware client, where the first context request carries description information corresponding to requested context information; and matching released context sources by using the description information, and if matching succeeds, acquiring context information provided by at least one matched context source, and sending the acquired context information to the context aware client. The technical solutions according to the embodiments of the present disclosure help implement the context aware service application in a flexible and standard manner.

11 Claims, 5 Drawing Sheets

(51) Int. Cl.
*H04L 12/28* (2006.01)
*H04L 29/06* (2006.01)
*H04W 4/00* (2009.01)

(52) U.S. Cl.
CPC *H04L 29/06* (2013.01); *H04W 4/00* (2013.01)
USPC .................. 707/758; 707/749; 707/E17.002; 370/331; 370/338; 370/401; 445/422.1; 445/437; 709/204; 709/228

(56) References Cited

U.S. PATENT DOCUMENTS

| | | | | |
|---|---|---|---|---|
| 6,606,744 | B1 * | 8/2003 | Mikurak | 717/174 |
| 6,671,818 | B1 * | 12/2003 | Mikurak | 714/4.21 |
| 7,330,895 | B1 * | 2/2008 | Horvitz | 709/227 |
| 7,392,247 | B2 * | 6/2008 | Chen et al. | 707/694 |
| 7,395,507 | B2 * | 7/2008 | Robarts et al. | 715/744 |
| 8,014,813 | B2 * | 9/2011 | Rey et al. | 455/522 |
| 8,073,565 | B2 * | 12/2011 | Johnson | 700/245 |
| 8,103,665 | B2 * | 1/2012 | Abbott et al. | 707/729 |
| 8,751,743 | B2 * | 6/2014 | Burge, III | 455/456.2 |
| 2002/0161862 | A1 * | 10/2002 | Horvitz | 709/220 |
| 2002/0174199 | A1 * | 11/2002 | Horvitz | 709/220 |
| 2003/0018692 | A1 * | 1/2003 | Ebling et al. | 709/108 |
| 2004/0034752 | A1 * | 2/2004 | Ohran | 711/161 |
| 2005/0185060 | A1 | 8/2005 | Neven, Sr. | |
| 2005/0246314 | A1 * | 11/2005 | Eder | 707/1 |
| 2006/0005156 | A1 * | 1/2006 | Korpipaa et al. | 717/100 |
| 2006/0020633 | A1 * | 1/2006 | Cho | 707/104.1 |
| 2008/0207137 | A1 * | 8/2008 | Maharajh et al. | 455/74 |
| 2008/0317054 | A1 * | 12/2008 | Yin | 370/401 |
| 2009/0089078 | A1 * | 4/2009 | Bursey | 705/1 |
| 2009/0092099 | A1 * | 4/2009 | Gu et al. | 370/331 |
| 2009/0157419 | A1 * | 6/2009 | Bursey | 705/1 |
| 2009/0313041 | A1 * | 12/2009 | Eder | 705/2 |
| 2010/0050079 | A1 * | 2/2010 | Thompson | 715/708 |
| 2010/0070448 | A1 * | 3/2010 | Omoigui | 706/47 |
| 2010/0222080 | A1 * | 9/2010 | Carreras et al. | 455/456.3 |
| 2011/0222080 | A1 * | 9/2011 | Monga et al. | 358/1.9 |
| 2011/0225368 | A1 * | 9/2011 | Burge, III | 711/118 |
| 2012/0190386 | A1 * | 7/2012 | Anderson | 455/456.3 |
| 2013/0064221 | A1 * | 3/2013 | Pampu et al. | 370/331 |
| 2014/0025786 | A1 * | 1/2014 | Gage | 709/219 |

FOREIGN PATENT DOCUMENTS

| | | | |
|---|---|---|---|
| CN | 101315632 | A | 12/2008 |
| CN | 101334792 | A | 12/2008 |
| CN | 101446899 | A | 6/2009 |
| CN | 101883107 | A | 11/2010 |
| CN | 101997827 | A | 3/2011 |
| WO | WO 2005/103980 | A2 | 11/2005 |
| WO | WO 2005/114476 | A1 | 12/2005 |

OTHER PUBLICATIONS

Guanling Chen, Ming Li, David Kotz—"Data-centric middleware for context-aware pervasive computing"—Pervasive and Mobile Computing—vol. 4, Issue 2, Apr. 2008, pp. 216-253.*

Office Action issued in corresponding Chinese patent Application No. 201010213660.X, mailed Jul. 4, 2012.

"Draft Standard for a Next Generation Service Overlay Network" IEEE P1903, Dec. 2009.

Written Opinion of the International Searching Authority issued in corresponding PCT Patent Application No. PCT/CN2011/074570, mailed Sep. 1, 2011.

International Search Report issued in corresponding PCT Patent Application No. PCT/CN2011/074570, mailed Sep. 1, 2011.

"Draft Architecture Document for Next Generation Service Overlay Network" IEEE P1903™/D1, Mar. 2010.

Yi et al., "Modifications on Subsection 6.2.1.6 Context Awareness (CA) FE" for (IEEE P1903), Piscataway/meeting. Mar. 23-25, 2010.

Extended European Search Report issued in corresponding European Patent Application No. 1179565.9, mailed Jun. 3, 2013, 9 pages.

* cited by examiner

METHOD FOR IMPLEMENTING CONTEXT AWARE SERVICE APPLICATION AND RELATED APPARATUS

CROSS-REFERENCE TO RELATED APPLICATIONS

This application is a continuation of International Application No. PCT/CN2011/074570, filed on May 24, 2011, which claims priority to Chinese Patent Application No. 201010213660.X, filed on Jun. 18, 2010, both of which are hereby incorporated by reference in their entireties.

FIELD

The present disclosure relates to the field of computer technologies, and in particular to a method for implementing a context aware service application and a related apparatus.

BACKGROUND

The concept of pervasive computing was proposed at the end of last century and the beginning of this century. Pervasive computing is defined as an omnipresent computing method that can be performed anywhere anytime. Based on pervasive computing, people may obtain needed information and services anytime anywhere. At present, pervasive computing has become an extremely dynamic and influencing research field, which mainly involves such aspects as mobile computing, context aware, natural man-machine interaction, pervasive network, intelligent space, embedded system, software structure, security privacy, hardware technology, and battery technology etc.

The context aware (CA) is one of the most important research subjects in pervasive computing. The industry has held certain discussions about context aware service applications. However, so far, the industry has not proposed a flexible and standard context aware service application model. Therefore, the context aware service application cannot be implemented in a flexible and standard manner.

SUMMARY

Embodiments of the present disclosure provide a method for implementing a context aware service application and a related apparatus, which solve the problem in the prior art where the context aware service application cannot be implemented in a flexible and standard manner.

In order to solve the foregoing technical problems, the embodiments of the present disclosure provide the following technical solutions:

A method for implementing a context aware service application is provided, including: receiving, by a context aware service platform, a first context request from a context aware client, where the first context request carries description information corresponding to requested context information; and matching released context sources by using the description information, and if matching succeeds, acquiring context information provided by at least one matched context source, and sending the acquired context information to the context aware client.

A method for releasing a context source is provided, including: receiving, by a context aware service platform, a request for releasing a context source, where the request for releasing the context source carries identity information, access type information, and access control policy information of the context source; and saving, by the context aware service platform, the identity information, access type information, and access control policy information of the context source.

A method for implementing a context aware service application is provided, including: sending, by a context aware client when triggered by a local application, a first context request to a context aware service platform, where the first context request carries description information corresponding to requested context information; and if receiving context information, which is delivered by the context aware service platform, adapting the context information to the local application.

A context aware service platform is provided, including: a receiving module, configured to receive a first context request from a context aware client, where the first context request carries description information corresponding to requested context information; and a first matching and delivering module, configured to match released context sources by using the description information, and if matching succeeds, acquire context information provided by at least one matched context source, and send the acquired context information to the context aware client.

A context aware client is provided, including: a sending module, configured to send, when triggered by a local application, a first context request to a context aware service platform, where the first context request carries description information corresponding to requested context information; and a context information receiving and adapting module, configured to adapt the context information to the local application after receiving context information delivered by the context aware service platform.

As shown in the technical solutions, embodiments of the present disclosure provide a CA application architecture based on a CA client and a CA service platform. The CA service platform may provide corresponding CS context for the CA client according to the context request of the CA client. This application architecture helps implement the context aware service application in a flexible and standard manner.

BRIEF DESCRIPTION OF THE DRAWINGS

To illustrate the technical solutions in the embodiments of the present disclosure or in the prior art more clearly, the accompanying drawings needed for describing the embodiments or the prior art are introduced briefly in the following. Apparently, the accompanying drawings in the following description merely show some embodiments of the present disclosure, and persons skilled in the art may derive other drawings from these accompanying drawings without creative efforts.

DETAILED DESCRIPTION OF THE EMBODIMENTS

Figure 1:
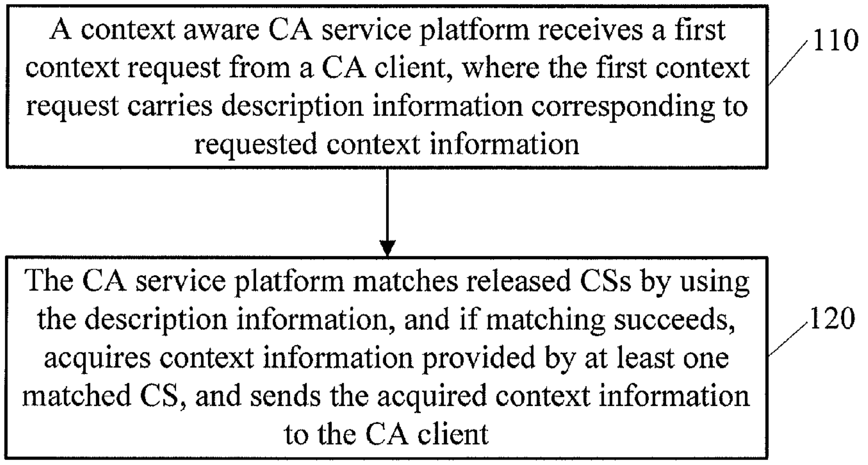
FIG. 1 is a flow chart of a method for implementing a context aware service application according to Embodiment 1 of the present disclosure.

Embodiments of the present disclosure provide a method for implementing a context aware service application and a related apparatus, which help implement a context aware service application in a flexible and standard manner.

In order to make the disclosure objectives, features, and advantages of the present disclosure more comprehensible, the technical solutions of the present disclosure are to be clearly and completely described in the following with reference to the embodiments and accompanying drawings of the present disclosure. It is obvious that the embodiments to be described are a part rather than all of the embodiments of the present disclosure. All other embodiments obtained by persons skilled in the art based on the embodiments of the present disclosure without creative effects shall fall within the protection scope of the present disclosure.

In the background of network convergence, it becomes increasingly easy to acquire information on a future telecom network. However, the subject of using information is generally “human”. Information needs to be well regulated and organized so that it is provided for a related application, thus meeting human’s mobile application requirements in all aspects. In the mobile Internet environment, where more and more server and client applications emerge, it becomes very meaningful to simplify a user operation based on context information and provide a more intelligent and convenient service architecture. The server and client may be computing equipments including a hardware processor and memory accessible to the hardware processor.

Embodiments of the present disclosure are mainly based on a client-server communication architecture, and try to provide standard context information organization, management, and invoking manners, thereby simplifying the user operation and management, and enriching context applications.

In the framework for implementing the context aware service application according to this embodiment, a new CA server having a hardware processor is deployed at the network side, and a CA service platform (context aware service platform) is deployed on the CA server; a CA client having a hardware processor (context aware client) is configured on the user terminal or other devices, the CA client works with the CA service platform, and the CA client may organize, manage, and execute local applications (the location application is an application of the device where the CA client is located) according to the context information, and invoke the CA service of the CA service platform, for example, request context information from the CA service platform; the CA service platform may collect, organize, and manage various third-party (context sources) CA service information to form various types of CA service logic and deliver context information to the CA client.

In one application scenario, the CA client deployed on a device (such as a user terminal) works with the CA service platform deployed on the CA server, and may organize, dispatch, and execute related application programs according to time, location, and object (including user, service, and network) to meet various requirements of people for living, work, and entertainment.

In the embodiments of the present disclosure, a context source (CS) may also be called context provider (CP). The CS provides (original or standard) context information. The CS may be various devices on the Internet, sensors deployed in various places, or other devices. A user terminal such as a mobile phone may also serve as a CS. The CA service platform is a bridge between various CA service applications and services on the CA client and Internet. Each CS may perform CS release (similar to registration) on the CA service platform, and release CS related information on the CA service platform. The CS related information released on the CA service platform may include: an identity of the CS, and may further include information such as access type (or a default access type may be used) and access control policy (or a default access control policy may be used, or full access is open, and so on) etc. The CA service platform may actively or passively acquire context information from released CSs, and the CA client may request, from the CA service platform, the context information provided by released CSs.

The following describes the technical solution provided in the embodiments of the present disclosure with specific embodiments.

Embodiment 1

The following describes an embodiment of a method for implementing a context aware service application from the aspect of a CA service platform. The method may include: receiving, by a CA service platform, a first context request from a CA client, where the first context request carries description information corresponding to requested context information; and matching released context sources by using the description information, and if matching succeeds, acquiring context information provided by at least one matched context source, and sending the acquired context information to the CA client.

As shown in FIG. 1, the specific steps may include the following:

110: The CA service platform receives the first context request from the CA client, where the first context request carries description information corresponding to requested context information.

In one application scenario, the CA client may send the first context application to the CA service platform, for example when the CA client is triggered by a certain local application, to request corresponding context information.

The description information (which may also be called related description information) corresponding to the context information in this embodiment mainly describes related properties and characteristics of the corresponding context information, and the like. In actual applications, the description information corresponding to the requested context information in the context request may include at least one of the following information: CS identity, related one keyword or multiple keywords, and so on.

120: The CA service platform matches released CSs by using the description information, and if matching succeeds, acquires context information provided by at least one matched CS, and sends the acquired context information to the CA client.

In one application scenario, the CA service platform may directly acquire context information provided by all matched CSs, or may acquire context information provided by part of matched CSs (the CA service platform or CA client selects at least one preferred CS from all matched CSs), and sends the acquired context information to the CA client.

In actual applications, releasing CSs on the CA service platform may include:

receiving, by the CA service platform, a request for releasing a CS (for example, from a CS), and the request for releasing the CS carries related description information of the CS, where the related description information of the CS may include, for example, identity information of the CS, and may further include access type information of the CS (for example, communication protocol, port, and active/passive access indicator etc), access control policy information of the CS, and keywords of the context information provided by the CS; and saving, by the CS platform, related description information such as the identity information of the CS, access type information of the CS, access control policy information of the CS, and keywords of the context information provided by the CS.

The CS released on the CA service platform may be a local CS of the CA client or non-local CS (such as a CS on the Internet, a CS on sensors, or a CS on other devices).

In actual applications, the CA service platform may match, according to a preset matching algorithm (such as exact match or fuzzy match), released CSs by using description information corresponding to context information acquired by parsing the first context request. If CS matching succeeds, that is, one released CS or multiple released CSs are successfully matched, information about a collection of matched CSs (the information about the collection of CSs may be recorded by using the form of a CS list, and may be put in a first context request response and delivered to the CA client) may be sent to the CA client. The collection of CSs may include part or all of the CSs matched by the CA service platform.

Further, the CA service platform may further filter the collection of matched context sources according to a preset preference policy (which may refer to, for example: access response speed of the CS (a fast response speed is preferred), current access load of the CS (a small current access load is preferred), and whether a CS is the local CS of the device where the CA client is located (a local CS of the device where the CA client is located is preferred)), and deliver to the CA client, information about a collection of CSs acquired by filtering the collection of matched CSs. For example, the collection of matched CSs includes ten CSs totally. Five favorable CSs are selected from the collection according to a preset preference policy. Then, the CA service platform sends a collection of CSs (which may be called a collection of preferred CSs) that include the five favorable CSs to the CA client.

In one application scenario, if matching released CSs by the CA service platform by using description information corresponding to context information acquired by parsing the first context request fails, that is, no released CS is matched, the CA service platform may notify the CA client of a context request failure (for example, send, to the CA client, a first context request response that carries a request failure indicator), or the CA service platform may further obtain a keyword through association and inference by using the description information corresponding to context information acquired by parsing the first context request; and match released CSs by using the keyword obtained through association and inference; if CS matching succeeds, deliver information about a collection of matched CSs to the CA client; if CS matching still fails, notify the CA client of the context request failure this time.

In addition, after determining that this context request fails (the method for the CA client to determine the failure of this context request may include, for example: determining that this context request fails when the CA service platform notifies a request failure, or when no information about a collection of matched CSs delivered by the CA service platform is received within a set duration), the CA client may terminate the corresponding context information request procedure; or may choose to further send a second context request to the CA service platform to request context information from the CA service platform again, where the second context request may carry updated description information corresponding to the requested context information (the CA client may add, delete, or modify related description information on the basis of the preceding description information, or choose new description information). If the CA service platform receives the second context request from the CA client, it may obtain a keyword through association and inference by using the updated description information acquired by parsing from the second context request, and match released CSs by using the keyword obtained through association and inference. If CS matching succeeds, the CA client delivers information about a collection of matched CSs; if CS matching still fails, the CA client may be notified of the failure of this context request. The rest is deduced from analogy.

If the CA client receives context information delivered by the context aware service platform, it may adapt the context information to the local application.

If the CA client receives information about a collection of matched released CSs delivered by the CA service platform, it may select one CS or multiple CSs from the collection of CSs according to a user instruction or a preset policy; acquire context information provided by the selected CS (it may acquire the context information through the CA service platform; if the selected CS is a local CS, it may also directly acquire the context information from the local CS), and adapt the context information to the local application.

In one application scenario, the CA client may preferably select, from the collection of CSs delivered by the CS service platform, a local CS that meets requirements. If the collection of CSs does not include a local CS that meets requirements, a non-local CS that meets requirements may be selected from the collection of CSs.

If the CA client needs to acquire context information provided by the selected CS through the CA service platform, it may send, to the CA service platform, a selective context request that carries information about the CS selected by the CA client from the collection of CSs. Specially, if the CS selected by the CA client is a local CS, it may directly acquire the corresponding context information from the local CS, and certainly it may also choose to acquire the context information provided by the local CS through the CA service platform. For example, the CA client requests current position information, and the user terminal where the CA client is located is configured with a global positioning apparatus (local CS). In this case, the CA client may directly acquire the current position information from the local global positioning apparatus.

In one application scenario, that the CA service platform acquires context information provided by at least one matched context source may include: delivering information about matched context sources to the CA client; if a first selective context request from the CA client is received, and the first selective context request carries information about a CS selected by the CA client from the collection of context sources, acquiring the context information provided by the context source selected by the CA client. Or, the CA service platform may actively choose to acquire context information provided by at least one matched context source, or the CA service platform may choose to acquire context information provided by all matched context sources.

In one application scenario, if the CA service platform receives the first selective context request from the CA client, and the first selective context request carries information about the CS selected by the CA client from the collection of context sources, the CA service platform may establish, according to a corresponding access type of the CS selected by the CA client, a connection with the CS (if the connection is already established currently, the step of establishing the connection is omitted), and acquires the context information from the CS based on the connection established with the CS. Specially, if context information provided by the CS is buffered on the CA service platform (as the CA service platform may buffer context information that is provided by a CS, does not change in real time and is frequently requested), the CA service platform may directly acquire buffered context information provided by the CS, and deliver it to the CA client.

Further, the CA client may further carry user identity information and/or local application identity information in the context request. Before acquiring context information provided by at least one matched CS and delivering it to the CA client, the CA service platform may further determine, by using the user identity and/or local application identity and according to an access control policy of the at least one matched CS, whether the CA client is allowed to request the context information provided by the at least one matched CS; if it is allowed, execute the step of acquiring context information provided by at least one matched CS again; and if it is not allowed, notify the CA client of a request failure.

After acquiring the context information provided by the selected CS, the CA client adapts the context information to the local application. For example, the CA client may convert the context information into input that corresponds to the local application and provide it for the local application for processing, for example, provide it for a user for viewing through a browser or for other purposes.

As shown above, this embodiment provides an application architecture based on a CA client and a CA service platform. The CA service platform may provide corresponding CS context for the CA client according to the context request of the CA client. This application architecture helps implement the context aware service application in a flexible and standard manner.

An embodiment of the present disclosure further provides a method for releasing a context source, where a CA service platform receives a request for releasing a CS, the request for releasing the CS carries identity information, access type information, and access control policy information of the CS, and the context aware service platform saves the identity information, access type information, and access control policy information of the CS.

The following describes another embodiment of the method for implementing the context aware service application according to the present disclosure from the aspect of the CA service platform. The method may include: when triggered by a local application, sending, by a CA client, a first context request to the CA service platform, where the first context request carries description information corresponding to requested context information; and if context information delivered by the context aware service platform is received, adapting the context information to the local application.

In one application scenario, if the CA client receives information about a collection of released CSs successfully matched by using description information corresponding to the context information carried in the received context request delivered by the CA service platform, the CA client selects a CS from the collection of CSs according to a user instruction or a preset policy, and acquires context information provided by the selected CS.

In one application scenario, selecting, by the CA client, a CS from the collection of CSs according to a preset policy includes: preferably selecting, from the collection of CSs and according to the preset policy, a local CS that meets requirements, and if the collection of CSs do not include a local CS that meets requirements, selecting, from the collection of CSs, a non-local CS that meets requirements. Further, after acquiring the context information provided by the selected CS, the CA client may adapt the context information to the local application. The CA client may convert the context information into input that corresponds to the local application and provide it for the local application for processing, for example, provide it for a user for viewing through a browser or for other purposes.

Embodiment 2

Figure 2:
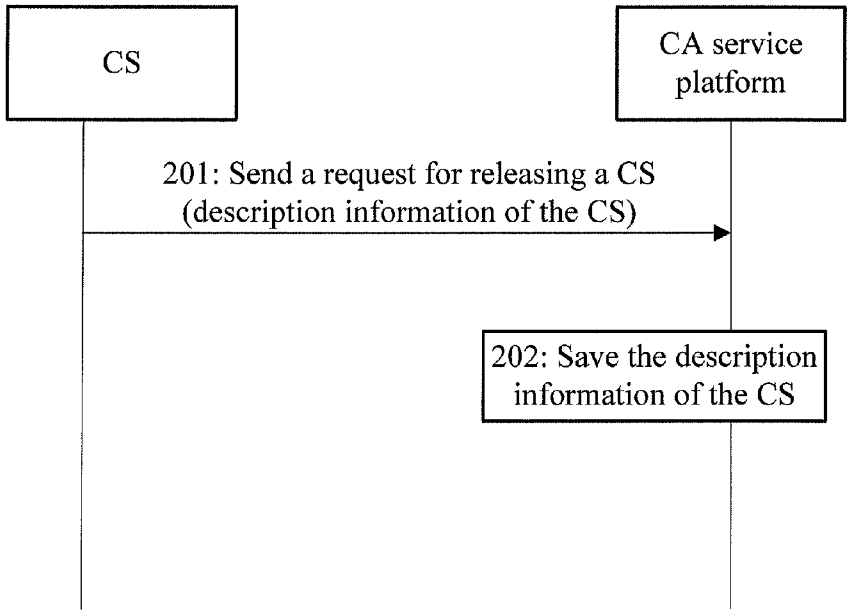
FIG. 2 is a flow chart of a method for releasing a CS according to Embodiment 2 of the present disclosure.

This embodiment mainly describes a method for releasing a CS in detail. As shown in FIG. 2, another embodiment of the method for releasing the CS according to the present disclosure may include the following:

201: A CS sends a request for releasing the CS to a CA service platform.

The CS here may refer to a CS on the Internet, a CS on a sensor, a CS on other devices, and so on. In addition, a CA client deployed on a device may also serve as a CS and release the CS to the CA service platform.

In one application scenario, the request for releasing the CS carries related description information of the CS. The related description information of the CS may include identity information of the CS (for example, address information, location information, and/or other distinguishing identity information of the CS), and may further include access control policy information of the CS (for example, allowing specific users to access, or fully open), access type information of the CS (which may include information such as port number, communication protocol, and data transmission manner), and a keyword of the context information provided by the CS.

202: The CA service platform receives the request for releasing the CS, parses the request for releasing the CS to obtain the carried related description information of the CS, and saves the related description information of the CS.

In actual applications, the related description information of the CS carried in the request for releasing the CS received by the CA service platform may be described by using multiple description methods.

The following takes an example of the case where XML is used to describe information released by the CS. For example, the related description information in the request for releasing the CS mainly includes information such as the context identity (Context ID) of the context information reported by the CS, CS address (for example, IP address, URI or other addresses), access type (including communication protocol, port, and active/passive access manner etc), and access control policy etc, and may further include one keyword or multiple keywords of the context information provided by the CS.

As an example, the context ID included in the information released by the CS is my location; the CS address URI is Http://Context.sample.com/location/get; the communication protocol is the HTTP protocol, the access port is port 12345, and the data transmission manner is active acquisition; the access control policy includes being accessible when my presence is allowed, and so on.

```
<Context ID="my location">
    <Context source>
        <URI>http://Context.sample.com/location/get</URI>
    < /Context source >
    <Access Type>
        <model>active</model>
        <port>12345</port>
        <protocol>http</protocol>
    </ Access Type >
    < Operation _policy>
        <time>always</time>
        <permission base on="my presence">allowed</
        permission>
        .......
    </ Operation _policy>
</Context>
```

In actual applications, the method for acquiring (including updating) context by the CA service platform may include active acquisition and passive acquisition.

The active acquisition manner may be the following: the CA service platform sends a context reporting request to the CS; the CS reports corresponding context according to the reporting request from the CA service platform.

The passive acquisition manner may be the following: the CA service platform creates an interception event and notifies the CS, and after the context of the CS is updated, the CS actively reports the updated context according to the interception port of the CA service platform; the CA service platform may further reply a context reporting response to the CS to notify the CS that the reported context is received.

As shown above, according to this embodiment, the CS releases related description information of the CS to the CA service platform through the request for releasing the CS, and the CA service platform saves the related description information of the CS. This mechanism can implement separate and standard release of a CS of various applications on the CA service platform, providing a basis for implementing CA service applications subsequently.

Embodiment 3

Figure 3:
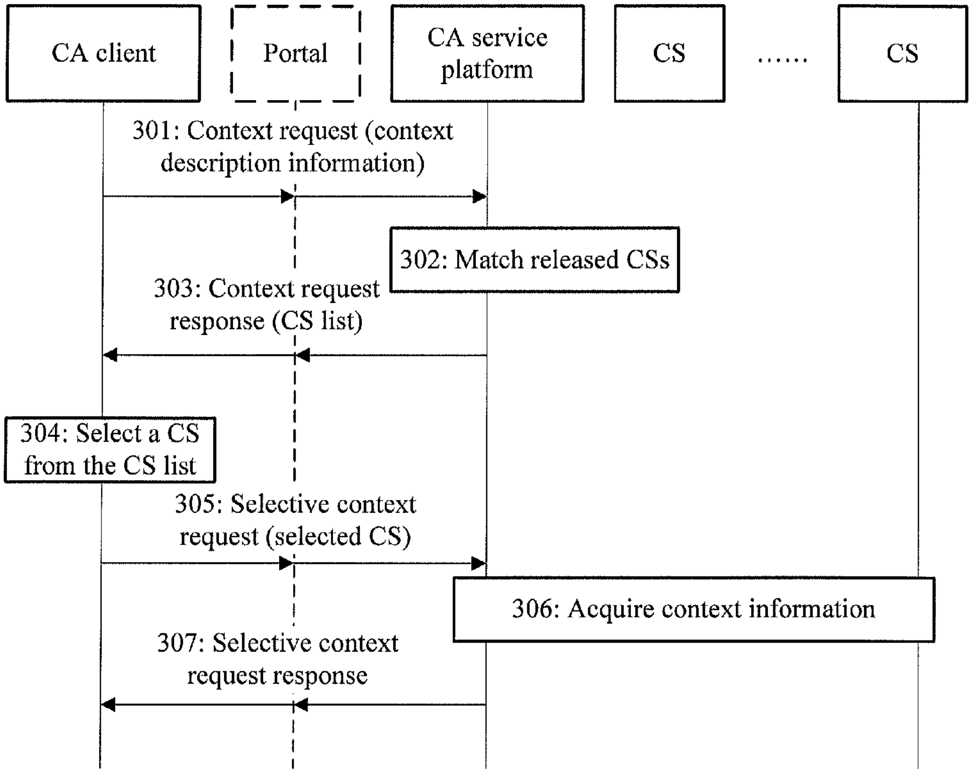
FIG. 3 is a flow chart of a method for implementing a context aware service application according to Embodiment 3 of the present disclosure.

To help better understand the technical solutions in the embodiments of the present disclosure, this embodiment takes an example of the case where a CA client acquires context for a local application for description. As shown in FIG. 3, another embodiment of the method for implementing a CA service application according to the present disclosure may include the following:

301: When triggered by a local application 1, the CA client generates, according to configuration information of the local application 1, related description information corresponding to context requested by the local application 1, and sends a context request message to the CA service platform, where the context request message carries the related description information of the context requested by the local application 1.

In actual applications, a user may preset a trigger condition used by the local application 1 to trigger the CA client, for example, to trigger when the local application 1 is executed or to trigger upon a user instruction, and so on.

302: The CA service platform receives the context request, and matches released CSs according to the related description information of the context, where the related description information is carried in the context request.

In actual applications, the CA service platform may match, according to a preset matching algorithm (such as exact match or fuzzy match), released CSs by using related description information corresponding to context information acquired by parsing the context request. For example, the CA service platform may extract one keyword or multiple keywords in the related description information of the context information, and use the extracted keywords for matching.

303: If the CA service platform successfully matches released CSs (that is, at least one released CS is matched), it sends a context request response to the CA client, where the context request response carries a CS list of matched CSs, and the CS list records information about one CS or multiple CSs matched by the CA service platform.

In addition, if the CA service platform fails to match released CSs, it may send, to the CA client, a context request response that carries a request failure indicator.

304: The CA client receives the context request response delivered by the CA service platform, and preferably selects a local CS from the CS list delivered by the CA service platform, where the local CS may be other related applications locally (for example, on a terminal). If the local CS does not meet service requirements of the local application 1, the CA client selects, from the delivered CS list, one non-local CS or multiple non-local CSs that can meet the service requirements of the local application 1.

305: The CA client sends a selective context request to the CA service platform, where the selective context request carries information about the CS selected by the CA client from the CS list delivered by the CA service platform.

306: The CA service platform receives the selective context request, and acquires context from the CS selected by the CA client, where the acquisition method may be active acquisition or passive acquisition.

307: The CA service platform sends, to the CA client, a selective context request response that carries the corresponding context acquired from the CS selected by the CA client. The CA client converts the corresponding context returned by the CA service platform into input of the local application 1, and provides it for the local application 1 for processing.

Further, during the process of requesting context from the CA service platform, the CA client may further send a user identity (UID) and/or an application identity (APP ID) of the local application to the CA service platform (for example, by carrying in the context request or selective context request, where the selective context request further carries an identity (CID) of the requested CS).

After receiving the request that carries the UID and/or APP ID, the CA service platform may determine, according to an access control policy of the corresponding CS requested for access by the CA client, whether to allow the CA client to request context information provided by the CS, for example, the access control policy of the CS indicates that a user or an application is allowed to request context information provided by the CS, or that a specific user or application is allowed to request context information provided by the CS. In this case, the CA service platform may authenticate this request of the CA client. If authentication is passed (that is, the CA client/local application has the permission to access the corresponding CS), the CA service platform acquires the context information provided by the CS and delivers it to the CA client.

Further, if authentication is passed, the CA service platform may further generate a token (Token) according to the UID, APPID, and CID, carry it in a corresponding reply message, and send the message to the CA client. When requesting the context information provided by the CS (or other CSs that have a dependency relationship with the CS) subsequently again, the CA client/local application may carry the UID and/or APPID+CID+Token in the context request or selective context request. The CA service platform may determine, according to the token, that the CA client has the permission to access the corresponding CS. The CA service platform may also acquire the context information provided by the CS and deliver it to the CA client.

It should be especially noted that one CS may provide multiple types of context information, and may set a dependency relationship between two or more types of context information. When the CA service platform allows a certain CA client to request one of the various types of context information provided by the CS, according to the dependency relationship, the CA service platform may also directly allow the CA client to request other one type or several types of context information provided by the CS. Similarly, a dependency relationship between two or more CSs may be set. When the CA service platform allows a certain CA client to request the context information provided by a certain CS, according to the dependency relationship, the CA service platform may also directly allow the CA client to request the context information provided by other CSs that have a dependency relationship with the CS.

In addition, if the CA service platform fails to authenticate the request of the CA client, it may notify the CA client of the request failure.

Further, a portal server may further be set between the CA client and the CA service platform. The portal server is used to forward information exchanged between the CA client and the CA service platform to enhance the scalability and compatibility of the CA client and the CA service platform.

As shown above, according to the CA application architecture based on a CA client and a CA service platform provided in this embodiment, the CA service platform supports release of the CS, and may provide corresponding CS context for the CA client according to the context request of the CA client. This application architecture helps implement context aware service applications in a flexible and standard manner.

Further, the CA application architecture of the CA client and CA service platform supports flexible context access control (oriented to user/application), helping enrich CSs and related context applications, and helping operators build and operate a pervasive computing oriented context aware information opening and control system.

The CA client may serve as a CS, or may also invoke various context applications, meeting users' requirements for personalized context aware applications.

Embodiment 4

To help better understand the technical solutions in the embodiments of the present disclosure, this embodiment takes the case where a CA client acquires context for a local application as an example for description. According to this embodiment, a CA service platform may first select a preferred matched CS and then send a CS list that records the preferred one CS or multiple CSs to the CA client. The CA client further selects a CS from the CS list returned by the CA service platform.

Figure 4:
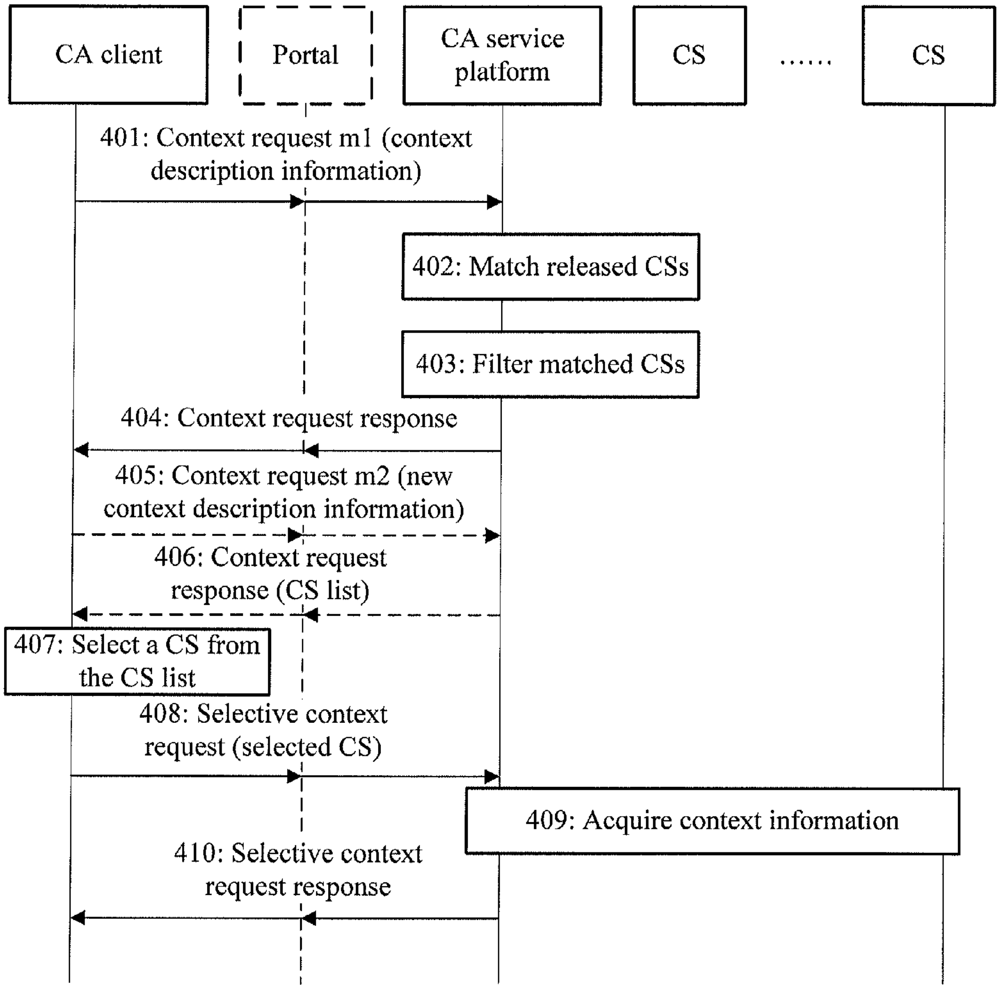
FIG. 4 is a flow chart of a method for implementing a context aware service application according to Embodiment 4 of the present disclosure.

As shown in FIG. 4, another embodiment of the method for implementing a CA service application according to the present disclosure may include the following:

401: When triggered by a local application 1, the CA client generates related description information of context requested by the local application 1 according to configuration information of the local application 1, and sends a context request m1 to the CA service platform, where the context request m1 carries the related description information of the context requested by the local application 1.

In actual applications, a user may preset a trigger condition used by the local application 1 to trigger the CA client, for example, triggered when the local application 1 is executed or triggered upon a user instruction, and so on.

402: The CA service platform receives the context request m1, and matches released CSs according to the related description information of the context, where the related description information is carried in the context request m1.

In actual applications, the CA service platform may match, according to a preset matching algorithm (such as exact match or fuzzy match), released CSs by using related description information corresponding to context information acquired by parsing the context request m1. For example, the CA service platform may extract one keyword or multiple keywords in the related description information of the context information, and use the extracted keywords for matching.

Further, if the CA service platform fails to match released CSs, it may further obtain one keyword or multiple keywords through association and inference according to the related description information of the context, where the related description information is carried in the context request m1, and use the keyword obtained through association and inference to match released CSs again.

403: If the CA service platform successfully matches released CSs, it may filter the collection of matched CSs according to a preset preference policy.

In actual applications, the preset preference policy of the CA service platform may be formulated by referring to the following:

Access response speed of the CS (a fast response speed is preferred), current access load of the CS (a small current access load is preferred), and whether the CS is the local CS of the device where the CA client is located (a local CS of the device where the CA client is located is preferred).

The CA service platform sends a context request response to the CA client. The context request response carries a CS list. The CS list records information about one CS or multiple CSs acquired by filtering, by the CA service platform, the collection of matched CSs.

For example, the collection of CSs matched by the CA service platform has five CSs in total. Three preferred CSs are acquired by filtering the collection according to a preset preference policy. Then the CS list delivered from the CA service platform to the CA client includes information about the three preferred CSs acquired by filtering.

In addition, if the CA service platform fails to match released CSs, it may send, to the CA client, a context request response that carries a request failure indicator.

404: The CA client receives the context request response delivered by the CA service platform. If the context request response carries a request failure indicator, step 405 is performed; if the context request response carries the CS list delivered by the CA service platform, step 407 is performed.

405: If the CA client determines that the request for context fails, it sends a context request m2 to the CA service platform. The context request m2 may carry updated related description information of the context information requested by the local application 1, where the CA client may add, delete, or modify related description information based on previous related description information, or select new related description information.

406: The CA service platform receives the context request m2, obtains one keyword or multiple keywords through association and inference according to the updated related description information of the context, where the updated related description information is carried in the context request m2, and uses the keyword obtained through association and inference to match released CSs.

If the CA service platform matches the CS successfully, it may still filter the collection of matched CSs according to a preset preference policy, and send a context request response to the CA client. The context request response carries a CS list. The CS list records information about one CS or multiple CSs acquired by filtering, by the CA service platform, the collection of matched CSs.

In addition, if the CA service platform still fails to match released CSs, it may send, to the CA client, a context request response that carries a request failure indicator. The rest is deduced through analogy.

407: The CA client preferably selects a local CS from the CS list delivered by the CA service platform, where the local CS may be other related applications locally (for example, on the terminal). If the local CS does not meet service requirements of the local application 1, the CA client selects one non-local CS or multiple non-local CSs that can meet the service requirements of the local application 1 from the delivered CS list.

408: The CA client sends a selective context request to the CA service platform, where the selective context request carries information about the CS selected by the CA client from the CS list delivered by the CA service platform.

409: The CA service platform receives the selective context request, and acquires context from the CS selected by the CA client, where the acquisition method may be active acquisition or passive acquisition.

410: The CA service platform sends, to the CA client, a selective context request response that carries the corresponding context acquired from the CS selected by the CA client. The CA client converts the corresponding context returned by the CA service platform into input of the local application 1, and provides the input for the local application 1 for processing.

Further, during the process of requesting context from the CA service platform, the CA client may further send a user identity (UID) and/or an application identity (APP ID) of the local application to the CA service platform (for example, by using the context request or selective context request, where the selective context request further carries an identity (CID) of the requested CS).

After receiving the request that carries the UID and/or APP ID, the CA service platform may authenticate this request of the CA client according to the access control policy of the corresponding CS requested for access by the CA. If authentication is passed (that is, the CA client/local application has the permission to access the corresponding CS), the CA service platform acquires context information provided by this CS, and delivers it to the CA client.

Further, if authentication is passed, the CA service platform may further generate a token (Token) according to the UID, APPID, and CID, carry it in a corresponding reply message, and send the message to the CA client. When requesting the context information provided by the CS (or other CSs that have a dependency relationship with the CS) subsequently, the CA client/local application may carry the UID and/or APPID+CID+Token in the context request or selective context request. The CA service platform may determine, according to the token, that the CA client has the permission to access the corresponding CS. The CA service platform may also acquire the context information provided by the CS and deliver it to the CA client.

It should be especially noted that one CS may provide multiple types of context information, and may set a dependency relationship between two or more types of context information. When the CA service platform allows a certain CA client to request one of the various types of context information provided by the CS, the CA service platform may also directly allow the CA client to request other one type or several types of context information provided by the CS according to the dependency relationship. Similarly, a dependency relationship between two or more CSs may be set. When the CA service platform allows a certain CA client to request the context information provided by a certain CS, the CA service platform may also directly allow the CA client to request the context information provided by other CSs that have a dependency relationship with the CS according to the dependency relationship.

In addition, if the CA service platform fails to authenticate the request of the CA client, it may notify the CA client of the request failure.

Further, a portal server may further be set between the CA client and the CA service platform. The portal server is used to forward information exchanged between the CA client and the CA service platform to enhance the scalability and compatibility of the CA client and the CA service platform.

As shown above, this embodiment provides a CA application architecture based on a CA client and a CA service platform, where the CA service platform supports release of the CS, and may provide corresponding CS context for the CA client according to the context request of the CA client. This application architecture helps implement the context aware service application in a flexible and standard manner.

Further, the CA application architecture of the CA client and CA service platform supports flexible context access control (oriented to user/application), helping enrich CSs and related context applications, and helping operators build and operate a pervasive computing oriented context aware information opening and control system.

The CA client may filter the matched CSs, further improving the efficiency and accuracy of the context request. The CA client may serve as a CS, or may also invoke various context applications, meeting users' requirements for personalized context aware applications.

To help better understand the technical solution provided in the embodiment of the present disclosure, the following further describes the technical solution of the present disclosure by using a specific embodiment with more examples.

For example, the CA client is deployed on a mobile phone terminal. Local applications of the mobile phone terminal include a search service application. A shooting application program (camera) on the mobile phone terminal may trigger the search service application.

At the CA service platform on the network side, released CPs of Internet services include: traffic service, sight service, historical service, and ticket service etc.

The release parameters of the traffic service on the CA server may include, for example, the following:

| Parameter Type | Parameter Description | Example |
|---|---|---|
| Identity (CID) | Uniquely identifies a context source. | A random number, 10.10.10 (domain: France, type: tourism/travel, random identity: traffic) |
| Address (Add) | CS address | URI, IP address |
| Input parameter (In) | Parameter information about an invoked service | Time, location |

-continued

| Parameter Type | Parameter Description | Example |
|---|---|---|
| Output parameter (Out) | Format of returned information | Web page |
| Access manner (Access) | Invokes a protocol. | HTPP |
| Policy control (Policy) | Invokes permission control. | Fully open |
| Operation manner (Operation) | Method for obtaining a service | Active |
| Charging (Charging) | Charging or not; tariff | Free |

The release parameters of the ticket service on the CA server may include, for example, the following:

| Parameter Type | Parameter Description | Example |
|---|---|---|
| Identity (CID) | Uniquely identifies a context source. | A random number, 10.12.130 (domain: France, type: tourism/travel, random identity: ticket) |
| Address (Add) | Address of the context source | URI, IP address |
| Input parameter (In) | Parameter information about an invoked service | Spot name |
| Output parameter (Out) | Format of returned information | Text |
| Access manner (Access) | Invokes a protocol. | HTTP |
| Policy control (Policy) | Invokes permission control. | Fully open |
| Operation manner (Operation) | Method for obtaining a service | Active |
| Charging (Charging) | Charging or not; tariff | Free |

Here, it is assumed that the spot service and historical service do not need to be actually invoked in this embodiment, and therefore no detailed parameter information is involved.

The user sets the CA client mode: tourism mode; search service triggered by the camera.

The CA service application process may be as follows:

Camera triggering: a user shoots a picture of a spot (for example, the Eiffel Tower) by using the camera on a mobile phone.

The CA client, based on the current tourism mode, generates a search keyword (that is, related description information of the requested context information) according to the picture of the Eiffel Tower, and sends, to the CA service platform, a context request that carries the generated search keyword and UID, for example, the Eiffel Tower and tourism.

The CA client may use various methods to identify the spot picture and the current location of the user:

For example, it matches the shot picture about the Eiffel Tower with pre-stored classical spot pictures to identify that the shot picture is about the Eiffel Tower. The CA client may request the location server to obtain the location information of the user. Other methods are not listed here.

An example of the context request sent by the CA client to the CA service platform is as follows:

http://www.Contextaware.com/get/for=travel&key=eiffeltowel&location=France. Paris.xx-street.

The context request may be sent to the CA service platform by using the hypertext transfer protocol or other protocols.

After receiving the context request information, the CA service platform parses the context request.

The CA service platform matches corresponding released CSs, for example, matches CSs such as the history of the Eiffel Tower, the ticket of the Eiffel Tower, and the transportation of the Eiffel Tower, and so on.

Assume that the user to which the CA client belongs is a legitimate operator registered user, and has the permission to access the CS. After verifying the permission, the CA service platform queries released context sources on the CA service platform, and searches for related tourism information of the Eiffel Tower. The CA service platform records information about matched CSs, such as the historical service of the Eiffel Tower, traffic service of the Eiffel Tower, and tick service of the Eiffel Tower, in a CS list, and delivers the information about matched CSs to the CA client.

Under the instruction of the user, the CA client selects the traffic service and ticket service of the Eiffel Tower from the CS list, carries the information about the selected CSs in the selective context request, and sends the request to the CA service platform.

The CA service platform carries the location information of the CA client in a context reporting request, and sends the request to the traffic service. The traffic service determines the best route from the user location to the Eiffel Tower. For example, it may provide traffic routes for walking, driving, public transportation, and metro in the form of Google Map.

An example of the context reporting request sent by the CA service platform to the traffic service is as follows: http://www.Trafficfrance.com/location=france.paris.xxstreet&time=2010-5-25-14:30.

The traffic service sends, to the CA service platform, a context reporting request response that carries the context information about the traffic routes. The CA service platform delivers the context information about the traffic routes to the CA client, and the CA client may present the context information about the traffic routes to the user.

In addition, the same is true for the ticket service.

As shown above, this embodiment provides a CA application architecture based on the CA client and the CA service platform. The CA service platform supports release of the CS, and may provide corresponding CS context for the CA client according to the context request of the CA client. This application architecture helps implement context aware service applications in a flexible and standard manner.

Further, it supports flexible context access control (oriented to user/application), helping enrich CSs and related context applications, and helping operators build and operate a pervasive computing oriented context aware information opening and control system.

The CA client may serve as a CS, or may also invoke various context applications, meeting users' requirements for personalized context aware applications.

Figure 5:
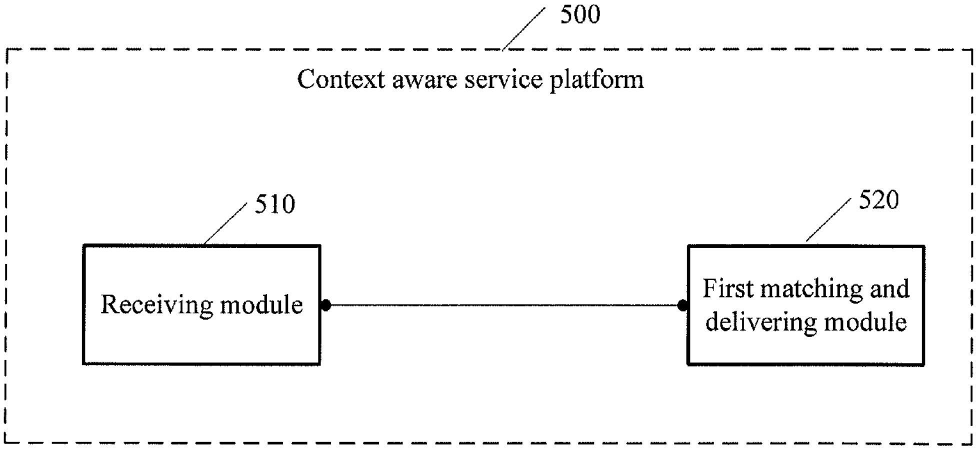
FIG. 5 is a schematic diagram of a context aware service platform according to an embodiment of the present disclosure.

To help better understand the technical solutions in the embodiments of the present disclosure, an embodiment of the present disclosure further provides a context aware service platform. As shown in FIG. 5, a context aware service platform 500 provided in an embodiment of the present disclosure may include:

a receiving module 510, configured to receive a first context request from a context aware client, where the first context request carries description information corresponding to requested context information; and a first matching and delivering module 520, configured to match released CSs by using the description information, and if matching succeeds, acquire context information provided by at least one matched CS, and send the acquired context information to the CA client.

In one application scenario, the first matching and delivering module 520 may include:

a first delivering submodule, configured to deliver information about a collection of matched context sources to the context aware client; and a first acquiring submodule, configured to when a first selective context request from the context aware client is received, and the first selective context request carries information about context sources selected by the context aware client from the collection of context sources, acquire context information provided by the context sources selected by the context aware client.

In an application scenario, the first delivering submodule may be specifically configured to filter the collection of matched context sources according to a preset preference policy, and deliver, to the context aware client, information about a collection of context sources acquired by filtering the collection of matched context sources.

In an application scenario, the context aware service platform 500 may further include:

a second receiving module, configured to: after matching the released context sources by using the description information fails, receive a second context request from the context aware client, where the second context request carries updated description information corresponding to the requested context information; and a second matching and delivering module, configured to obtain a keyword through association and inference by using the updated description information; match the released context sources by using the keyword; and if matching succeeds, acquire context information provided by at least one matched context source, and send the acquired context information to the context aware client.

In an application scenario, the context aware service platform 500 may further include:

a third matching and delivering module, configured to after matching the released context sources by using the description information fails, obtain a keyword through association and inference by using the description information; match the released context sources by using the keyword; and if matching succeeds, acquire context information provided by at least one matched context source, and send the acquired context information to the context aware client.

In an application scenario, the context aware service platform 500 may further include:

a release receiving module, configured to receive a request for releasing a context source, where the request for releasing the context source carries identity information, access type information, and access control policy information of the context source; and a release saving module, configured to save the identity information, access type information, and access control policy information of the context source, where the context source is a local context source or a non-local context source of the context aware client.

In an application scenario, that the first/second/third matching and delivering module acquires the context information provided by the at least one matched context source may include:

according to an access type of the at least one matched context source, establishing a connection with the at least one matched context source; and based on the established connection with the at least one matched context source, acquiring the context information provided by the at least one matched context source.

In an application scenario, the context request may further carry user identity information and/or local application identity information; the context aware service platform 500 may further include:

an access controlling module, configured to before acquiring context information provided by at least one matched context source, determine, by using the user identity and/or local application identity and according to an access control policy of the at least one matched context source, whether the context aware client is allowed to request the context information provided by the at least one matched context source; and if allowed, execute a step of acquiring the context information provided by the at least one matched context source.

It may be understood that the context aware service platform 500 according to this embodiment may be like the CA service platform in the preceding embodiment, and the functions of each of its functional modules may be specifically implemented according to the methods provided in embodiments of the present disclosure, which are not described here again.

As shown above, the context aware service platform 500 according to this embodiment supports release of CSs, and may provide the context of a corresponding CS for the CA client according to the context request of the CA client. This application architecture helps implement context aware service applications in a flexible and standard manner.

Further, the CA application architecture of the CA service platform supports flexible context access control (oriented to user/application), helping enrich CSs and related context applications, and helping operators build and operate a pervasive computing oriented context aware information opening and control system.

Figure 6:
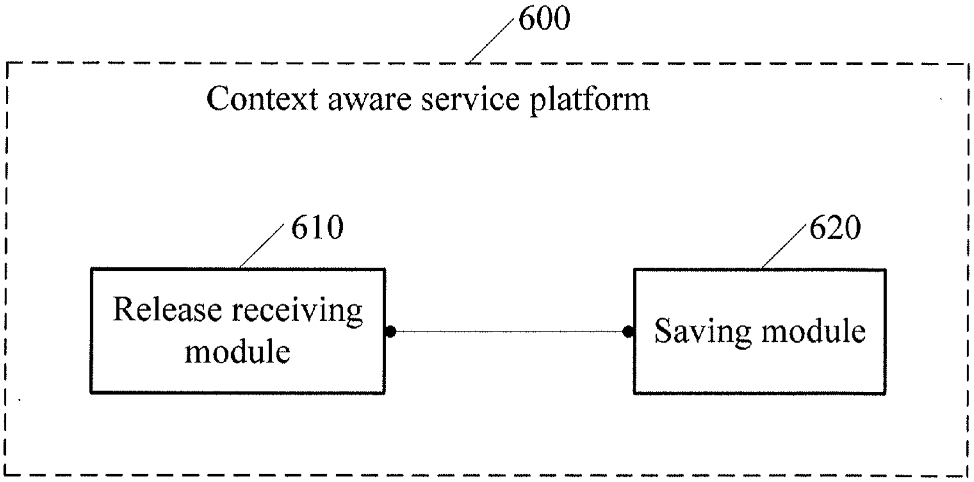
FIG. 6 is a schematic diagram of another context aware service platform according to an embodiment of the present disclosure.

As shown in FIG. 6, a context aware service platform 600 is provided in an embodiment of the present disclosure. It may include:

a release receiving module 610, configured to receive a request for releasing a context source, where the request for releasing the context source carries identity information, access type information, and access control policy information of the context source; and a saving module 620, configured to save the identity information, access type information, and access control policy information of the context source.

It may be understood that the context aware service platform 600 according to this embodiment may be like the CA service platform in the preceding embodiment, and the functions of each of its functional modules may be specifically implemented according to the methods provided in embodiments of the present disclosure, which are not described here again.

As shown above, according to this embodiment, the context aware service platform 600 supports release of related description information of the CS, and the CA service platform saves the related description information of the CS. This mechanism can implement separate and standard release of a CS of each application on the CA service platform, providing a basis for implementing CA service applications subsequently.

Figure 7:
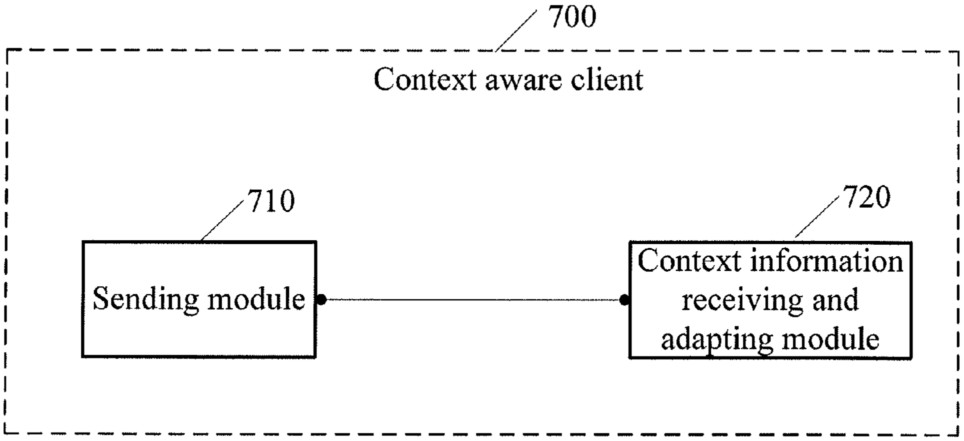
FIG. 7 is a schematic diagram of a context aware client according to an embodiment of the present disclosure.

As shown in FIG. 7, a context aware client 700 is provided in an embodiment of the present disclosure. It may include:

a sending module 710, configured to send, when triggered by a local application, a first context request to a context aware service platform, where the first context request carries description information corresponding to requested context information; and a context information receiving and adapting module 720, configured to: after receiving context information delivered by the context aware service platform, adapt the context information to the local application.

In an application scenario, the context aware client 700 may further include:

a receiving and selecting module, configured to: after receiving information about a collection of released context sources successfully matched by using the description information delivered by the context aware service platform, select a context source from the collection of the context sources according to a user instruction or a preset policy; and an acquiring and adapting module, configured to acquire context information provided by the context source that is selected, and adapt the context information to the local application.

In an application scenario, the receiving and selecting module is specifically configured to according to a preset policy, preferably select, from the collection of the context sources, a local context source that meets requirements; and if the collection of the context sources does not include the local context source that meets requirements, select, from the collection of the context sources, a non-local context source that meets requirements.

It may be understood that the context aware client 700 according to this embodiment may be like the CA client in the preceding embodiment, and it may be deployed on multiple types of devices, for example may be deployed on a mobile phone terminal. The functions of each of its functional modules may be specifically implemented according to the methods in the preceding embodiments, which are not described here again.

As shown above, the context aware client 700 according to this embodiment may request context for the CA service platform when triggered by a local application, and may adapt the context returned by the CA service platform to the local application. This application architecture helps implement context aware service applications in a flexible and standard manner.

The CA client may filter the matched CSs, further improving the efficiency and accuracy of the context request. The CA client may serve as a CS, or may also invoke various context applications, meeting users' requirements for personalized context aware applications.

A context aware service system according to an embodiment of the present disclosure may include:

the context aware service platform 500 and/or the context aware client 700.

A context aware service system according to an embodiment of the present disclosure may include:

a context aware client, configured to send, when triggered by a local application, a first context request to a context aware service platform, where the first context request carries description information corresponding to requested context information; and after receiving context information delivered by the context aware service platform, adapt the context information to the local application; and the context aware service platform, configured to receive the first context request from the context aware client, where the first context request carries description information of the requested context information; match released context sources by using the description information, and if matching succeeds, acquire context information provided by at least one matched context source, and send the acquired context information to the context aware client.

Figure 8:
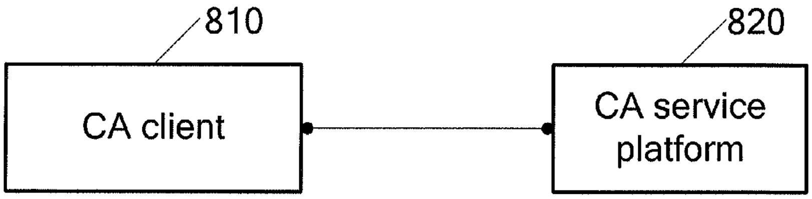
FIG. 8 is a schematic diagram of a context aware service system according to an embodiment of the present disclosure.

As shown in FIG. 8, another context aware service application system further provided in this embodiment may include: a CA client 810 and a CA service platform 820.

Various local applications and services are deployed and run on the CA client 810. The CA client 810 may include: an application program managing unit, a context input and output unit, a context storing unit, a policy and privacy controlling unit, and a context source access unit.

The application program managing unit is configured to manage application programs of a user terminal, including system built-in application programs and application programs downloaded by a user.

The context input and output unit is configured to: based on user input, make a judgment and automatically generate a context information request (context information output) and receive a response message (context information input).

The context storing unit is configured to store context collected by the CA client.

The policy and privacy controlling unit is configured to release, according to user settings, an opening policy and privacy protection for the context information.

The context source access unit is an interface of the CA client for collecting context source information.

The CA service platform 820 may include: a context distributing unit, a model managing unit, a request and subscription managing unit, a context catalog unit, a context policy managing unit, a context inferring unit, a context storing unit, and a context converging unit.

The context distributing unit is configured to release context sources to each context information requester (including the CA client).

The model managing unit is configured to establish a context information model according to a context type, helping manage context information, for example, key-value pair and ontology library.

The request and subscription managing unit is configured to push updated context information in a timely manner to a subscriber according to a context request of a context information requester, and may further analyze and process the context request.

The context catalog unit is configured to store related description information of context source released by the CS and may further be configured to query and match the context request.

The context policy managing unit is configured to manage access to released context sources and perform access control, including verification and authorization.

The context inferring unit is configured to further infer raw context to obtain standard context.

The context storing unit is configured to store buffered context.

The context converging unit is configured to perform operations such as de-duplication, normalization, and sampling on the raw context (Raw Context).

In an application scenario, the working manner for each functional unit of the CA client 810 and CA service platform 820 may be as follows:

The context information input and output unit of the CA client 810 interacts with the request and subscription managing unit of the CA service platform 820, and they are configured to transfer messages between the CA client 810 and the CA service platform 820.

After receiving the context request from the CA client 810, the request and subscription managing unit of the CA service platform 820 invokes the context policy managing unit. The context policy managing unit verifies an identity and a permission of the requester for the request according to an access control policy of the requested context source. After verification is passed, it indicates that the requester has the permission to request the context provided by the context source.

The request and subscription managing unit queries the context catalog unit. The context catalog unit returns a list of context sources according to an inquiry condition. The request and subscription managing unit returns the list of context sources to the input and output unit of the CA client. The input and output unit of the CA client 810 queries the context information managing unit for local CS resources (or this query is determined after the request and subscription managing unit of the CA service platform 820 queries a context catalog). If a local CS exists, the context access unit acquires context information of the local CS; if no local CS exists, context sources released at the CA service platform 820 are invoked. The input and output unit of the CA client 810 sends a selective context message to the request and subscription managing unit of the CA service platform 820. The context distributing unit communicates with the corresponding CS to obtain the context information of the context source. If the context information of the corresponding CS is buffered in the context storing unit, the context information in the context storing unit is directly returned.

It should be noted that, for a brief description, the above method embodiments are represented as a series of actions. But those skilled in the art should appreciate that the present disclosure is not limited to the order of the described actions, because according to the present disclosure, some steps may adopt other orders or occur simultaneously. Next, those skilled in the art should also appreciate that all the embodiments described in the specification are exemplary embodiments, and that involved actions and modules are not necessarily needed by the present disclosure.

In the above embodiments, the description of each embodiment has its emphasis, and some embodiments may not be detailed. Reference may be made to the relevant description of other embodiments.

To sum up, the embodiments of the present disclosure provide a CA application architecture based on a CA client and a CA service platform, where the CA service platform supports release of the CS, and may provide corresponding CS context for the CA client according to the context request of the CA client. This application architecture helps implement context aware service applications in a flexible and standard manner.

Further, the CA application architecture of the CA client and CA service platform supports flexible context access control (oriented to user/application), helping enrich CSs and related context applications, and helping operators build and operate a pervasive computing oriented context aware information opening and control system.

The CA client may filter the matched CSs, further improving the efficiency and accuracy of the context request. The CA client may serve as a CS, or may also invoke various context applications, meeting users' requirements for personalized context aware applications.

Persons skilled in the art should understand that all or a part of the steps of the method according to the embodiments of the present disclosure may be implemented by a program instructing relevant hardware. The program may be stored in a computer readable storage medium, such as a read only memory, a random access memory, a magnetic disk or an optical disk.

A method for implementing a context aware service application and a related apparatus are provided in the preceding embodiments of the present disclosure. Several examples are adapted for illustration of the principles and implementation methods of the present disclosure. The description of these examples is merely intended to help illustrate the method and its core principles in an embodiment of the present disclosure. In addition, for persons skilled in the art, according to the principle of the present disclosure, the specific implementation methods and application scope are subject to changes. In summary, the content in the specification shall not be comprehended as restriction on the present disclosure.

The invention claimed is:

1. A method for implementing a context aware service application, comprising a context aware service platform having at least a processor executing program codes of the context aware service application stored in a non-transitory computer readable memory to perform functions, comprising:

receiving a first context request from a context aware client, wherein the first context request carries description information corresponding to requested context information; and matching a released context source by using the description information, and if matching succeeds, acquiring context information provided by at least one matched context source, and sending acquired context information to the context aware client, wherein the acquiring of context information provided by the at least one matched context source, comprising:

filtering a collection of matched context sources according to a preset preference policy, and delivering, to the context aware client, information about the collection of matched context sources acquired by filtering the collection of matched context sources; and if a first selective context request from the context aware client is received, and the first selective context request carries information about a context source selected by the context aware client from the collection of context sources, acquiring context information provided by the context source selected by the context aware client.

2. The method according to claim 1, wherein if matching the released context sources by using the description information fails, the method further comprises:

receiving a second context request from the context aware client, wherein the second context request carries updated description information corresponding to requested context information;

obtaining a keyword through association and inference by using the updated description information; and matching released context sources by using the keyword, and if matching succeeds, acquiring context information provided by at least one matched context source, and sending acquired context information to the context aware client.

3. The method according to claim 1, wherein if matching the released context sources by using the description information fails, the method further comprises:

obtaining a keyword through association and inference by using the description information; and matching released context sources by using the keyword, and if matching succeeds, acquiring context information provided by at least one matched context source, and sending acquired context information to the context aware client.

4. The method according to claim 1, wherein acquiring context information provided by at least one matched context source comprises:

according to an access type of the at least one matched context source, establishing a connection with the at least one matched context source; and based on a established connection with the at least one matched context source, acquiring the context information provided by the at least one matched context source.

5. The method according to claim 1, wherein:

the context request further carries information about a user identity and/or a local application identity; and before the acquiring context information provided by at least one matched context source, the method further comprises:

determining, by using the user identity and/or local application identity and according to an access control policy of the at least one matched context source, whether the context aware client is allowed to request the context information provided by the at least one matched context source; and if allowed, executing a step of acquiring the context information provided by the at least one matched context source.

6. The method according to claim 1, wherein before receiving the first context request, the method further comprising:

receiving by the context aware service platform, a request for releasing a context source, wherein the request for releasing the context source carries identity information, access type information, and access control policy information of the context source; and storing by the context aware service platform, the identity information, access type information, and access control policy information of the context source.

7. The method according to claim 6, when the context source updates its context information, comprising:

the context aware service platform send a context information report request to the context source; the context source, according the context information report request, reports updated context information.

8. The method according to claim 6, when the context source updates its context information, comprising:

the context aware service platform creates a monitor event and sends a notice to the context source; after updating the context information of the context source, the context source sends the updated context information, through a monitor port, to the context aware service platform initiatively.

9. A method for implementing a context aware service application, comprising a context aware service client having at least a processor executing program codes of the context aware service application stored in a non-transitory computer readable memory to perform functions, comprising:

when triggered by a local application, sending a first context request to a context aware service platform, wherein the first context request carries description information corresponding to requested context information; and if context information delivered by the context aware service platform is received, adapting the context information to the local application;

if information about a collection of released context sources successfully matched by using the description information delivered by the context aware service platform is received, selecting a context source from the collection of the context sources according to a user instruction or a preset policy, and acquiring context information provided by the selected context source, wherein the selecting of the context source from the collection of the context sources according to a preset policy comprises:

selecting according to the preset policy, from the collection of the context sources, a local context source that meets requirements; and if the collection of the context sources does not comprise the local context source that meets requirements, selecting, from the collection of the context sources, a non-local context source that meets requirements.

10. A context aware service platform device, comprising:

a transceiver, a processor functionally coupled to a non-transitory computer readable storage medium which stores instruction codes of a context aware service application executable by the processor, wherein:

the transceiver is configured to receive a first context request from a context aware client, wherein the first context request carries description information corresponding to requested context information; and the instruction codes of the context aware service application when executed by the processor:

cause the context aware service platform device to match released context sources by using description information, and if matching succeeds, acquire context information provided by at least one matched context source, wherein the transceiver is further configured to send acquired context information to the context aware client;

wherein the acquiring of the context information provided by at least one matched context source, comprising:

filtering a collection of matched context sources according to a preset preference policy, and delivering, to the context aware client, information about the collection of matched context sources acquired by filtering the collection of matched context sources; and if a first selective context request from the context aware client is received, and the first selective context request carries information about a context source selected by the context aware client from the collection of context sources, acquiring context information provided by the context source selected by the context aware client.

11. A context aware client, comprising:

a transceiver, a processor functionally coupled to a non-transitory computer readable storage medium which stores instruction codes of a context aware service application executable by the processor , wherein:

the transceiver is configured to send, a first context request to a context aware service platform when triggered by a local application, and to receive context information delivered by the context aware service platform, or to receive information about a collection of released context sources successfully matched by utilizing the description information delivered by the context aware service platform, wherein the first context request carries description information corresponding to requested context information; and the computer instruction codes of the context aware service application, when executed by the processor:

cause the context aware service platform device to adapt the context information to the local application, if context information delivered by the context aware service platform is received, and select a context source from the collection of the context sources according to a user instruction or a preset policy, and acquire context information provided by the selected context source if information about a collection of released context sources successfully matched by using the description information delivered by the context aware service platform is received;

wherein the selecting of the context source from the collection of the context sources according to a preset policy comprises:

selecting according to the preset policy, from the collection of the context sources, a local context source that meets requirements; and if the collection of the context sources does not comprise the local context source that meets requirements, selecting from the collection of the context sources, a non-local context source that meets requirements.

* * * * *